United States Patent [19]
Panish et al.

[11] Patent Number: 5,973,874
[45] Date of Patent: Oct. 26, 1999

[54] FOUR CHANNEL AZIMUTH AND TWO CHANNEL NON-AZIMUTH READ-AFTER-WRITE LONGITUDINAL MAGNETIC HEAD

[75] Inventors: Joseph M. Panish, Littleton; George A. Saliba, Northboro; Mitchell R. Steinberg, Upton, all of Mass.

[73] Assignee: Quantum Corporation, Milpitas, Calif.

[21] Appl. No.: 09/177,904

[22] Filed: Oct. 23, 1998

Related U.S. Application Data

[62] Division of application No. 08/760,794, Dec. 4, 1996, Pat. No. 5,867,339
[60] Provisional application No. 60/009,708, Jan. 11, 1996.

[51] Int. Cl.[6] .................................................. G11B 21/02
[52] U.S. Cl. ........................................ 360/76; 360/78.02
[58] Field of Search ................................. 360/76, 77.12, 360/78.02, 121

[56] References Cited

U.S. PATENT DOCUMENTS

| | | |
|---|---|---|
| 2,938,962 | 5/1960 | Konins et al. .......................... 360/76 |
| 4,539,615 | 9/1985 | Arai et al. ............................ 360/76 X |
| 5,307,217 | 4/1994 | Saliba ..................................... 360/76 |
| 5,371,638 | 12/1994 | Saliba ................................. 360/76 X |
| 5,523,904 | 6/1996 | Saliba ................................. 360/76 X |

*Primary Examiner*—Aristotelis M. Psitos
*Assistant Examiner*—James L Habermehl
*Attorney, Agent, or Firm*—David B. Harrison; John C. Chen

[57] ABSTRACT

A read-after-write head for four channel azimuth recording in one mode of operation and two channel non-azimuth recording in another mode of operation. Four forward write head gaps, four read head gaps, and four backward write head gaps are geometrically positioned within a rotatable and laterally indexable face plate of a recording head housing. The read and write heads gaps collectively provide four forward write channels, four read channels, and four backward write channels. During the azimuth mode of operation, the head is rotated to the preselected positive or negative azimuth angle and all of the read and write channels are utilized. During the non-azimuth, or vertical, mode of operation, write channels two and four are utilized in combination with read channels one and three to provide two-channel non-azimuth, or vertical, operation.

3 Claims, 5 Drawing Sheets

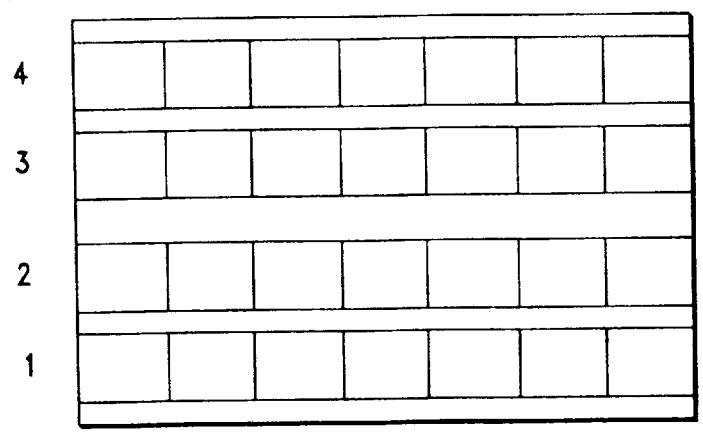
FIG.—1A
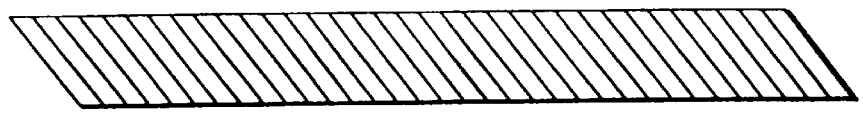
FIG.—1B
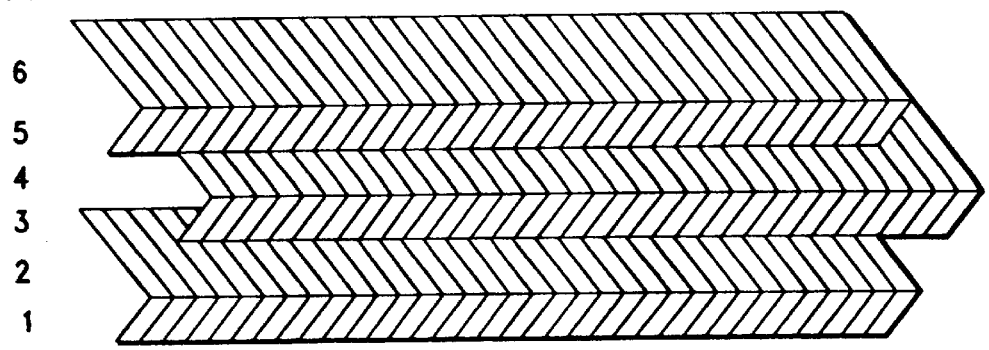
FIG.—1C

READING FORMAT (CH1)

FOUR CHANNEL AZIMUTH AND TWO CHANNEL NON-AZIMUTH READ-AFTER-WRITE LONGITUDINAL MAGNETIC HEAD

REFERENCE TO RELATED APPLICATION

This application is a divisional application of U.S. patent application Ser. No. 08/760,794, filed Dec. 4, 1996, now U.S. Pat. No. 5,867,339, which claims the benefit of U.S. Provisional Patent Application Ser. No. 60/009,708, filed on Jan. 11, 1996.

FIELD OF THE INVENTION

This invention relates in general to magnetic storage devices. More particularly this invention relates to a method and apparatus that efficiently provides azimuth as well as non-azimuth recording in a longitudinal magnetic tape recording system.

BACKGROUND OF THE INVENTION

The constantly increasing operational speeds of digital computers are creating a demand for corresponding increases in the data storage capacities of magnetic tape recording and reproducing systems, while maintaining the special requirements of high speed digital tape systems.

It is desirable that tape recording and reproducing systems for use as computer data storage devices provide high data transfer rates and perform a read check on all written data. Toward those ends, conventional tape systems typically employ methods of recording known as longitudinal recording, as illustrated in FIG. 1a, in which the tracks of data lie parallel to each other and parallel to the edges of the tape; or helical scan recording, as illustrated in FIG. 1b, in which the tracks of data lie parallel to each other but diagonal to the edges of the tape. The longitudinal recording method offers higher data transfer rates; but it would be desirable to obtain still higher data densities while retaining the advantages of the longitudinal recording method One limitation on track densities is crosstalk, which occurs when reading of data from one track is interfered with by data recorded on an adjacent track. Crosstalk is further exacerbated by error in head gap alignments. Some methods have been implemented to reduce this effect, such as leaving guard bands between tracks, or by using wider write head gaps. These methods, however, also tend to limit track densities, thereby limiting data densities.

A method of recording known as azimuth recording has been used in helical scan systems in order to decrease the effects of crosstalk and thus increase the track density of these systems. Azimuth recording results in a recorded track pattern in which the magnetization directions of adjacent data tracks lie at different azimuth angles to each other, as illustrated in FIG. 1c. This method greatly reduces inter-track crosstalk, enabling tracks to be placed closer together. The need for guard bands or wide write heads is thus reduced or eliminated. The helical scan method, however is subject to limited data transfer rates.

SUMMARY OF THE INVENTION

The present invention reduces the effects of one or more of the problems set forth above. In particular, the present invention provides a read-after-write longitudinal recording head so configured and operated as to be capable of four channel azimuth recording and playback, as well as two channel non-azimuth recording and playback operation, thereby enabling newer tape recorders equipped with the head to perform more-efficient four channel azimuth recording and playback, as well as to perform the older, less-efficient two channel non-azimuth recording thereby providing a backward compatibility with tapes recorded on the older generation of non-azimuthal longitudinal tape recording machines.

In accordance with one aspect of the present invention, a read-after-write tape recording head is provided which operates in a first mode to provide four channel azimuth recording and also operates in a second mode to provide two channel non-azimuth recording onto a magnetic tape recording medium.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIGS. 1a, 1b, and 1c illustrate respectively longitudinal, helical, and azimuth recording methods known in the art.

DETAILED DESCRIPTION OF A PREFERRED EMBODIMENT

The following descriptions of illustrative embodiments of the invention are presented as a description of structural elements contained in an illustrative apparatus and as operational steps performed in an illustrative method. The descriptions are derived from certain claims in the application as originally filed, but of course the claims are not intended and should not be deemed to be limited to the illustrative embodiments so described.

It is to be understood that the particular implementations described are intended as illustrations of, and not as limiting the scope of, the claims. In the interest of clarity, not all the routine features of the implementations are described. It will be appreciated that in the development of any such actual implementation, numerous implementation-specific decisions must be made to achieve the developers' specific goals such as compliance with system and business related constraints and that these goals will vary from one implementation to another. Moreover, it will be appreciated that such a development effort might be complex and time-consuming, but would never the less be a routine undertaking of engineering for those of ordinary skill having the benefit of this disclosure.

FIGS. 2–8 show the context of an illustrative longitudinal recording apparatus implementing a read-after-write head 100 for recording information onto and reading information from a magnetic tape storage medium (not shown) moving past the head 100 in a longitudinal forward or reverse direction. The magnetic tape storage medium stores information by means of particulate matter on (or in close proximity to) its surface that is selectively magnetized. The write head gaps "write" data onto the magnetic tape by selectively magnetizing the particulate matter in a well known manner, while the read head gaps "read" the magnetization of the particulate matter in a well known manner. The magnetic tape is drawn longitudinally past the head 100 in forward and reverse directions (in alignment with axis x of FIG. 2).

As is well known in the art, a read-after-write head provides error detection after writing in a given direction on a specific channel by means of a write head gap with a read head gap positioned in substantial alignment with the longitudinal direction of the magnetic tape medium on the specific channel. The read-after-write head 100 records information onto, and reads information from, longitudinal tracks defined on the magnetic tape storage medium either in a four-channel azimuth mode, or in a two-channel non-azimuth mode. The read-after-write head 100 while operating in two-channel non-azimuth mode provides backward compatibility with existing non-azimuthal tape recording devices and with tapes recorded on such devices.

Figure 2:
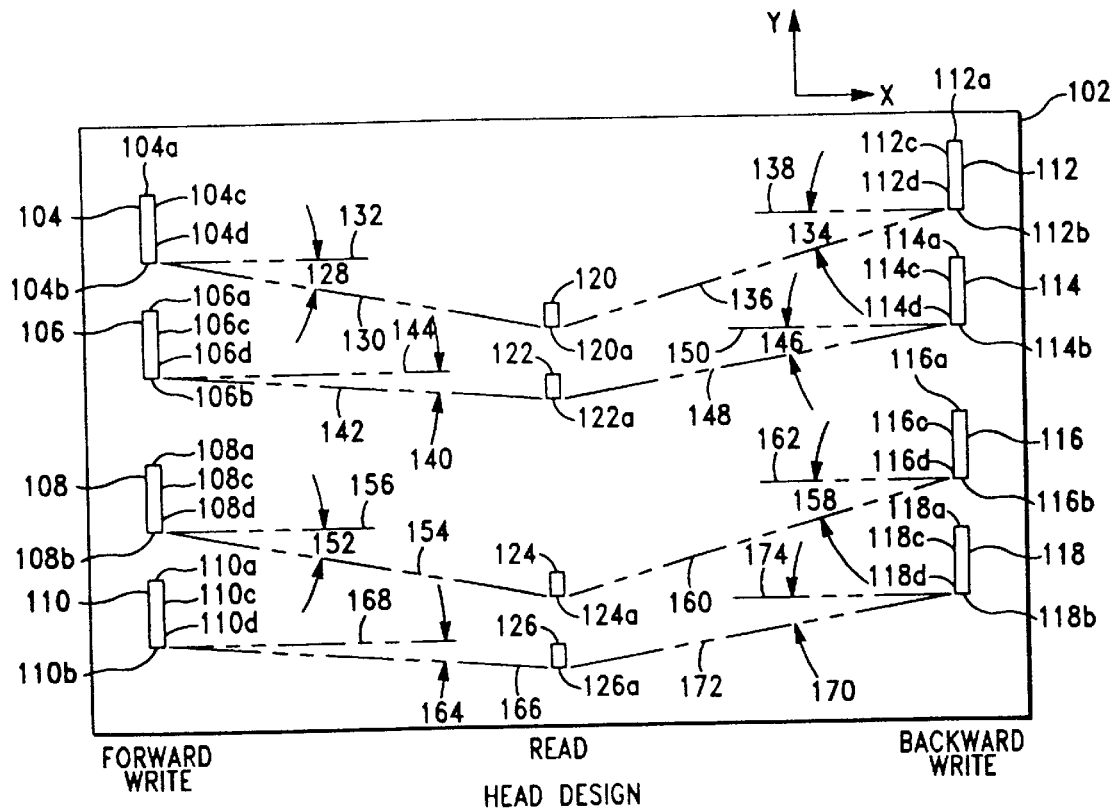
FIG. 2 is a front view of the bottom face of one embodiment of the read-after-write head of the present invention including four write heads for forward writing, four write heads for backward writing, and four read heads for read-after-writing and regular reading with the read and write heads positioned to permit operation in four-channel azimuth mode and two channel non-azimuth mode.

Generally speaking, the read-after-write head 100 provides four-channel azimuthal recording as well as two-channel non-azimuthal recording by following the FIG. 2 geometric layout of four forward write head gaps 104, 106, 108 and 110, four read head gaps 112, 114, 116 and 118, and four backward write head gaps 120, 122, 124 and 126. The read-after-write head 100 may be utilized in the azimuth and non-azimuth modes of operation by its use in conjunction with a conventional tape head controller that provides indexing of the tape head laterally across (along axis y in FIG. 2) the magnetic tape medium as well as rotation of the tape head relative to the tape for azimuth or non-azimuth operation. An exemplary head positioning structure is described in commonly assigned, copending U.S. patent application Ser. No. 08/557,662 to Kumar Kasetty, filed on Nov. 13, 1995 and entitled: "Tape Drive Head Positioning Device for Adjusting Head Tilt And Azimuth", the disclosure of which is incorporated herein by reference; and, an exemplary head controller is described in U.S. Pat. No. 5,307,217, issued to co-inventor George A. Saliba, on Apr. 26, 1994, the disclosure of which is also incorporated herein by reference.

As shown in FIG. 2, the read-after-write head apparatus 100 generally comprises a surface 102. In one illustrative embodiment, the surface 102 comprises a face plate which provides a rigid supporting structure for the read and write head gaps. The face plate will be attached to a conventional read-after-write head housing which in indexed laterally across the surface of the magnetic tape and also rotated to provide azimuth or non-azimuth modes of operation in a well known manner by a tape recorder controller of the type disclosed in U.S. Pat. No. 5,307,217 issued to George A. Saliba.

The surface 102 defines first 104, second 106, third 108, and fourth 110 laterally spaced apart forward-direction write head gaps including upper edges 104*a*, 106*a*, 108*a*, and 110*a*, lower edges 104*b*, 106*b*, 108*b*, and 110*b*, upper portions 104*c*, 106*c*, 108*c*, and 110*c*, and lower portions 104*d*, 106*d*, 108*d*, and 110*d* opening into the surface 102. The forward write head gaps 104, 106, 108, and 110 write data onto the magnetic tape recording medium in a well known manner during movement of the magnetic tape in the forward direction indicated by the arrow 205 in FIG. 3. In the four-channel azimuthal mode the forward-direction write head gaps 104, 106, 108, and 110 provide four forward write channels numbered consecutively 1, 2, 3, and 4 from top to bottom and simultaneously write to four longitudinal tracks defined on the forward moving magnetic tape.

The surface 102 also defines first 112, second 114, third 116, and fourth 118 laterally spaced apart backward-direction write head gaps including upper edges 112*a*, 114*a*, 116, and 118*a*, lower edges 112*b*, 114*b*, 116*b*, and 118*b*, upper portions 112*c*, 114*c*, 116*c*, and 118*c*, and lower portions 112*d*, 114*d*, 116*d*, and 118*d* opening into the surface 102 and spaced apart from the forward write head gaps 104, 106, 108, and 110. The forward write head gaps 104, 106, 108, and 110 and the backward write head gaps 112, 114, 116, and 118 are laterally offset. The backward write head gaps 112, 114, 116, and 118 write data onto the magnetic tape recording medium in a well known manner during movement of the magnetic tape in a direction opposite to that indicated by the arrow 205 in FIG. 3. In this manner, the backward-direction write head gaps 112, 114, 116, and 118 provide four backward write channels numbered consecutively 1, 2, 3, and 4 from top to bottom and simultaneously write to four additional longitudinal tracks defined on the reverse moving magnetic tape.

The surface 102 also defines first 120, second 122, third 124, and fourth 126 laterally spaced apart read head gaps including lower edges 120*a*, 122*a*, 124*a*, and 126*a* opening into the surface 102 and located between the forward write head gaps 104, 106, 108, and 110 and the backward write head gaps 112, 114, 116, and 118. The read head gaps 120, 122, 124, and 126 extend generally parallel to, and are laterally offset from, the forward head gaps 104, 106, 108, and 110 and backward write head gaps 112, 114, 116, and 118 and are unequally spaced apart from the forward write head gaps 104, 106, 108, and 110 and the backward write head gaps 112, 114, 116, and 118. The read head gaps 120, 122, 124, and 126 read data from the magnetic tape recording medium in a well known manner during movement of the magnetic tape in either direction. In this manner, the read head gaps 120, 122, 124, and 126 provide four forward/backward read channels numbered consecutively 1, 2, 3, and 4 from top to bottom.

The read head gaps 120, 122, 124, and 126 are positioned between the forward write head gaps 104, 106, 108, and 110, and the backward write head gaps 112, 114, 116, and 118. The read head gaps 120, 122, 124, and 126 may or may not be equally spaced from the forward and backward write head gaps depending upon the particular geometry influenced by the need for backward compatibility with existing model tape recording devices.

Figure 3:
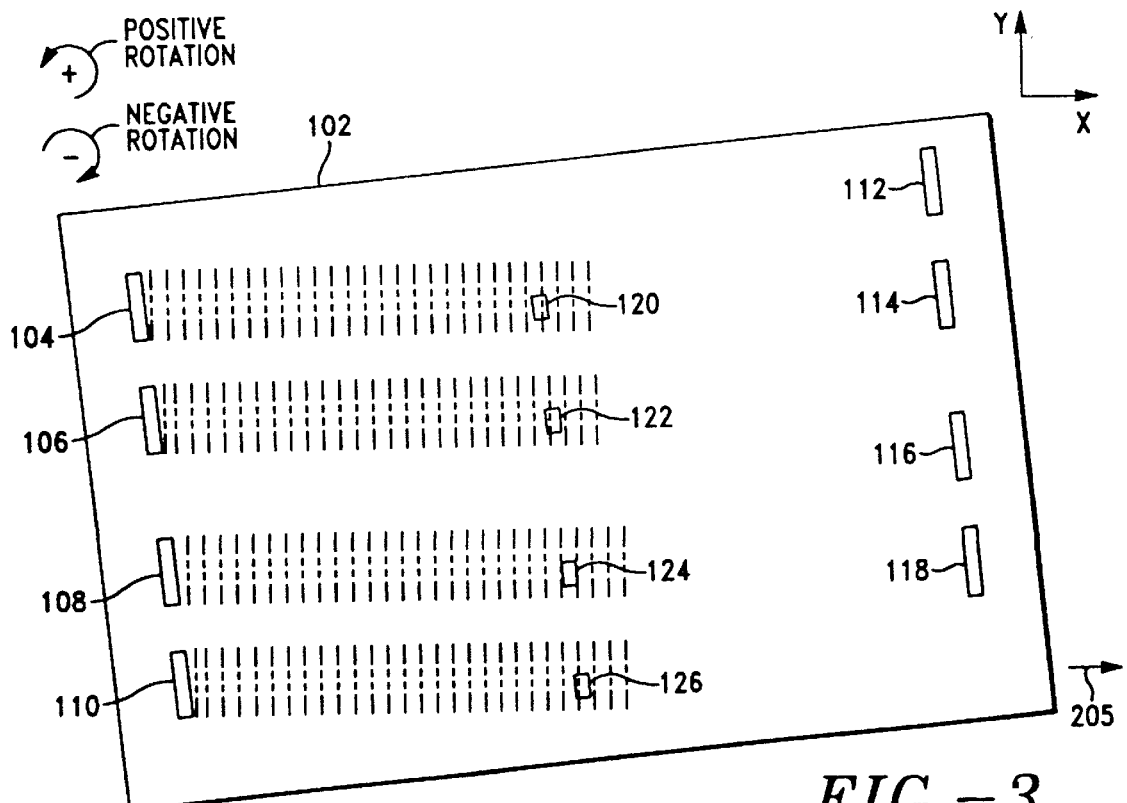
FIG. 3 illustrates writing onto a magnetic tape recording medium using the read-after-write head of FIG. 2 in a four channel azimuth mode of operation with the read-after-write head rotated approximately 9.4 degrees from the vertical direction.
Figure 4:
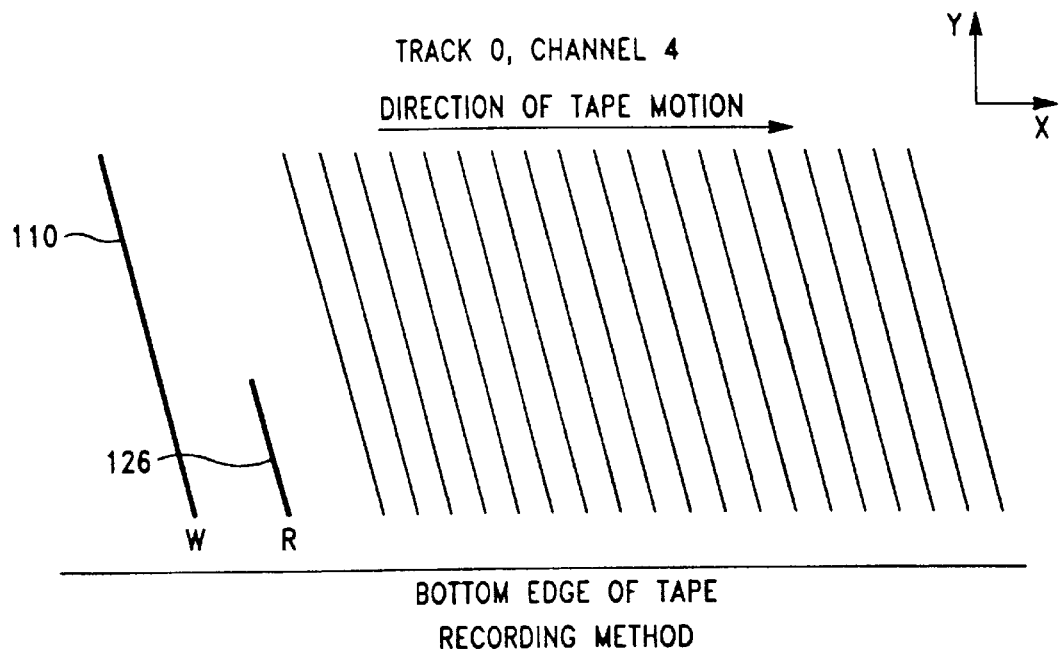
FIG. 4 illustrates writing onto track zero of the magnetic tape recording medium of FIG. 3 using the channel four write head gap of the read-after-write head of FIG. 2 in the four channel azimuth mode of operation.

As illustrated in FIG. 3, during the azimuth mode of operation with the read-after-write head 100 rotated positively relative to the vertical direction, the four forward write head gaps 104, 106, 108, and 110 (forward write channels one to four) and the four read head gaps 120, 122, 124, and 126 (read channels one to four) are substantially aligned with the longitudinal direction of the magnetic tape medium. Furthermore, the four read head gaps 120, 122, 124, and 126 (read channels one to four) are also positioned to provide read-after-write for the four forward write head gaps 104, 106, 108, and 110 (forward write channels one to four) to thereby provide a four channel read-after-write recording head. Likewise, during the azimuth mode of operation with the read-after-write head 100 rotated negatively relative to the vertical direction, the four backward write head gaps 112, 114, 116, and 118 (backward write channels one to four) and the four read head gaps 120, 122, 124, and 126 (read channels one to four) are substantially aligned with the longitudinal direction of the magnetic tape medium. Furthermore, the four read head gaps 120, 122, 124, and 126 (read channels one to four) are positioned to provide read-after-write for the four backward write head gaps 112, 114, 116, and 118 (backward write channels one to four) to thereby provide a four channel read-after-write recording head. Thus, the read-after-write head 100 provides four channel azimuth operation in both directions of tape motion.

Figure 7:
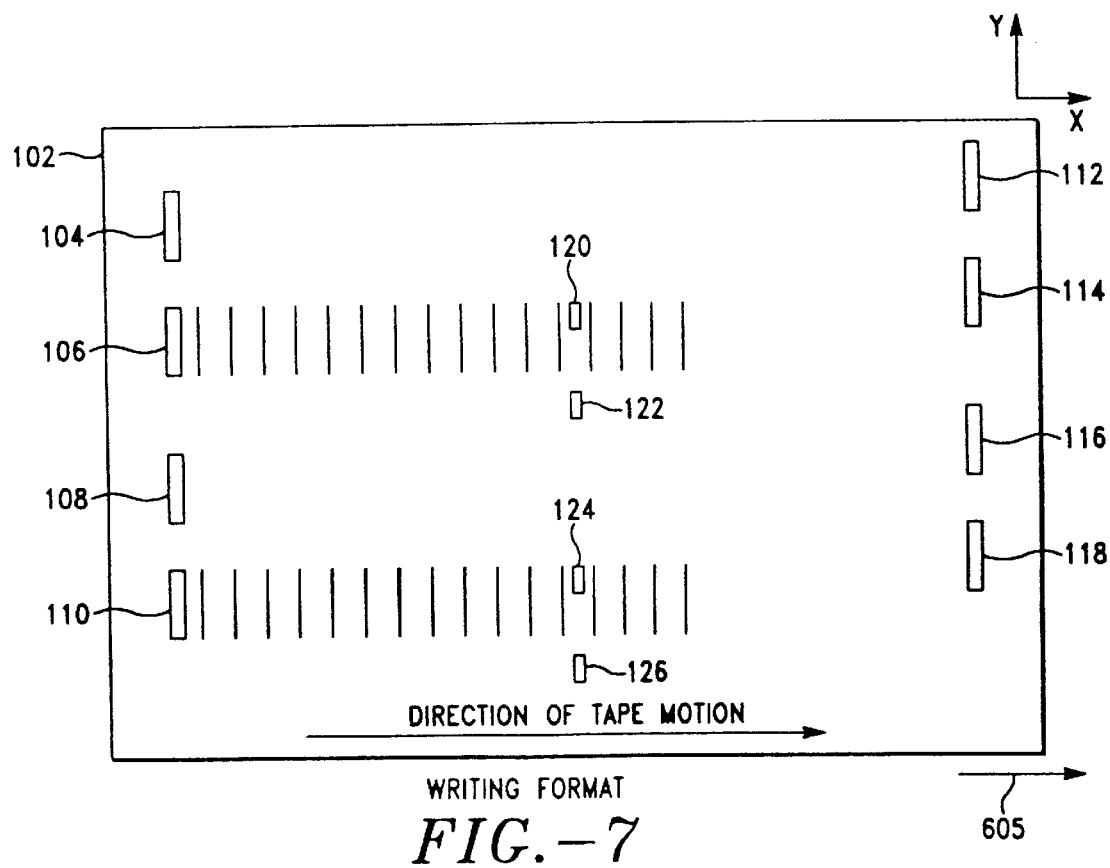
FIG. 7 illustrates writing onto the magnetic tape storage medium using write channels two and four of the read-after-write head of FIG. 2 with regular read and read-after-write provided by read channels one and three in the two channel non-azimuth recording mode of operation.

As illustrated in FIG. 7, during the non-azimuth (or vertical) mode of operation with the read-after-write head 100 in the neutral (or vertical position), the channel two forward write head gap 106, the channel one read head gap 120, and the channel two backward write head gap 114 are substantially aligned with the longitudinal direction of the magnetic tape medium, and the channel four forward write head gap 110, the channel three read head gap 124, and the channel four backward write head gap 118 are substantially aligned with the longitudinal direction of the magnetic tape medium. Furthermore, the channel one read head gap 120 is also positioned in opposing relationship to the upper portion 106c of the channel two forward write head gap 106 and also in opposing relationship to the lower portion 114d of the channel two backward write head gap 114 while the channel three read head gap 124 is positioned in opposing relationship to the upper portion 110c of the channel four forward write head gap 110 and also in opposing relationship to the lower portion 118d of the channel four backward write head gap 118. In this manner, the read-after-write head 100 provides a two-channel read-after-write recording operation in the non-azimuth mode of operation for tape motion in both directions using write channels two and four and read channel one and three.

The first read head gap 120 is positioned in opposing relationship to the upper portion 106c of the second forward write head gap 106 and the lower portion 114d of the second backward write head gap 114. As illustrated in FIGS. 2 and 7, the channel one read head gap 120 is positioned in opposing relationship to the upper portion 106c of the channel two forward write head gap 106 and also in opposing relationship to the lower portion 114d of the channel two backward write head gap 114.

The third read head gap 124 is positioned in opposing relationship to the upper portion 110c of the fourth forward write head gap 110 and the lower portion 118d of the fourth backward write head gap 118. As illustrated in FIGS. 2 and 7, the channel three read head gap 124 is positioned in opposing relationship to the upper portion 110c of the channel four forward write head gap 110 and also in opposing relationship to the lower portion 118d of the channel four backward write head gap 118.

Figure 5:
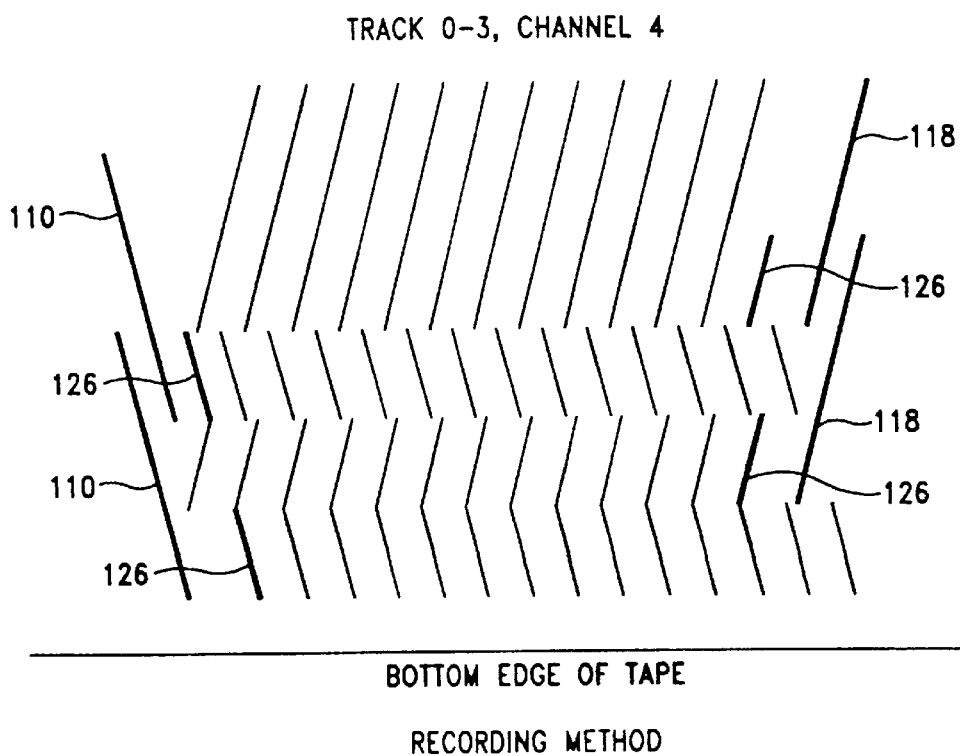
FIG. 5 illustrates writing onto longitudinal tracks zero, one, two, and three of the magnetic tape storage medium in sequence using the channel four forward and backward write head gaps of the read-after-write head of FIG. 2 in the azimuth recording mode of operation.
Figure 6:
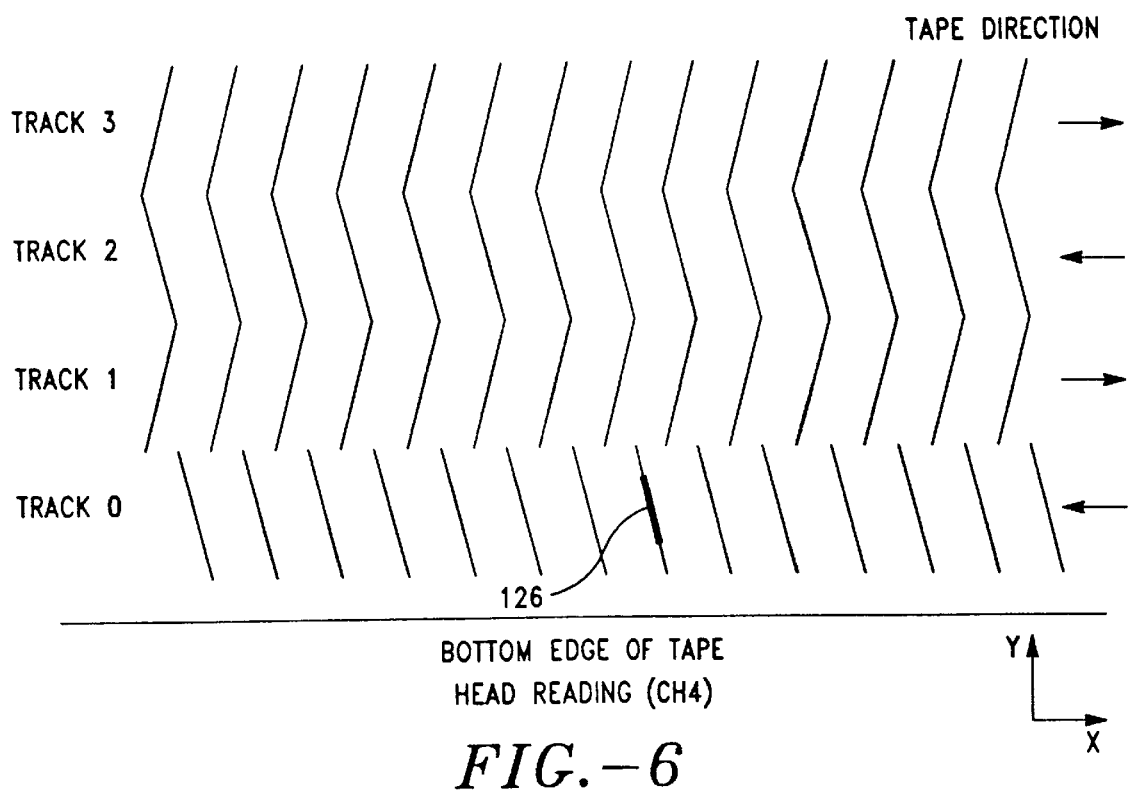
FIG. 6 illustrates reading tracks zero, one, two, and three of the magnetic tape storage medium using the channel four read head gap of the read-after-write head of FIG. 2 in the azimuth recording mode of operation and also indicating the direction of tape motion during this mode of operation.

An angle 128 between a line 130 tangent to the lower edge 104b of the first forward write head gap 104 and the lower edge 120a of the first read head gap 120 and a line 132 perpendicular to gap 104 at the lower edge 104b is substantially equal to an angle 134 between a line 136 tangent to the lower edge 112b of the first backward write head gap 112 and the lower edge 120a of the first read head gap 120 and a line 138 perpendicular to gap 112 at the lower edge 112b. As illustrated in FIGS. 2 and 5, the geometric relationship between the channel one forward write head gap 104, the channel one read head gap 120, and the channel one backward write head gap 112 positions the channel one read head gap 120 to provide read-after-write (and regular read for that track) for the channel one forward write head gap 104 during positive rotation of the read-after-write head 100 to the preselected azimuth angle and read-after-write (and regular read for that track) for the channel one backward write head gap 112 during negative rotation of the read-after-write head 100 to the preselected azimuth angle. Positive rotation of head 100 is in a counter-clockwise sense while negative rotation is in a clockwise sense, as shown in FIG. 3.

An angle 140 between a line 142 tangent to the lower edge 106b of the second forward write head gap 106 and the lower edge 122a of the second read head gap 122 and a line 144 perpendicular to gap 106 at the lower edge 106b is substantially equal to an angle 146 between a line 148 tangent to the lower edge 114b of the second backward write head gap 114 and the lower edge 122a of the second read head gap 122 and a line 150 perpendicular to gap 114 at the lower edge 114b. As illustrated in FIGS. 2 and 5, the geometric relationship between the channel two forward write head gap 106, the channel two read head gap 122, and the channel two backward write head gap 114 positions the channel two read head gap 122 to provide read-after-write (and regular read for that track) for the channel two forward write head gap 106 during positive rotation of the read-after-write head 100 to the preselected azimuth angle and read-after-write (and regular read for that track) for the channel two backward write head gap 114 during negative rotation of the read-after-write head 100 to the preselected azimuth angle.

An angle 152 between a line 154 tangent to the lower edge 108b of the third forward write head gap 108 and the lower edge 124a of the third read head gap 124 and a line 156 perpendicular to gap 108 at the lower edge 108b is substantially equal to an angle 158 between a line 160 tangent to the lower edge 116b of the third backward write head gap 116 and the lower edge 124a of the third read head gap 124 and a line 162 perpendicular to gap 116 at the lower edge 116b. As illustrated in FIGS. 2 and 5, the geometric relationship between the channel three forward write head gap 108, the channel three read head gap 124, and the channel three backward write head gap 118 positions the channel three read head gap 124 to provide read-after-write (and regular read for that track) for the channel three forward write head gap 108 during positive rotation of the read-after-write head 100 to the preselected azimuth angle and read-after-write (and regular read for that track) for the channel three backward write head gap 116 during negative rotation of the read-after-write head 100 to the preselected azimuth angle.

An angle 164 between a line 166 tangent to the lower edge 110b of the fourth forward write head gap 110 and the lower edge 126a of the fourth read head gap 126 and a line 168 perpendicular to gap 110 at the lower edge 110b is substantially equal to an angle 170 between a line 172 tangent to the lower edge 118b of the fourth backward write head gap 118 and the lower edge 126a of the fourth read head gap 126 and a line 174 perpendicular to gap 118 at the lower edge 118b. As illustrated in FIGS. 2 and 5, the geometric relationship between the channel four forward write head gap 110, the channel four read head gap 126, and the channel four backward write head gap 118 positions the channel four read head gap 126 to provide read-after-write (and regular read for that track) for the channel four forward write head gap 110 during positive rotation of the read-after-write head 100 to the preselected azimuth angle and read-after-write (and regular read for that track) for the channel four backward write head gap 118 during negative rotation of the read-after-write head 100 to the preselected azimuth angle.

Thus, the angles 128, 134, 140, 146, 152, 158, 164, and 170 are all substantially equal to the selected azimuth angle thereby to provide proper alignment of the forward write head gaps, read head gaps, and backward write head gaps during the four-channel azimuth mode of operation.

The method of the present invention advantageously enables a single conventional tape recording apparatus to selectively provide azimuth and non-azimuth modes of operation. The read-after-write head 100 may be controllably positioned (including the conventional recording head motions of indexing and rotation) by adapting a conventional tape recording machine to incorporate the control system disclosed in U.S. Pat. No. 5,307,217 issued to George A. Saliba. Such a control system is adapted in a known manner to provide azimuth and non-azimuth (or vertical) operational control of the read-after-write head 100 as, for example, in accordance with a head positioning structure described in the commonly assigned, copending U.S. patent application Ser. No. 08/557,662 referred to above.

As illustrated in FIGS. 3–6, in the azimuth mode of operation the read-after-write head 100 is indexed to a preselected position over the selected tracks of the magnetic tape medium which is moving in a forward direction (as indicated by the arrow 205 in FIG. 3) relative to the read-after-write head 100. The read-after-write head 100 is then rotated to the preselected positive azimuth angle. In this position, the forward write head gaps 104, 106, 108, and 110 (forward write channels 1–4) are substantially aligned with the longitudinal direction of the moving magnetic tape medium. Furthermore, the read head gaps 120, 122, 124, and 126 (read channels 1–4) are also substantially aligned with the longitudinal direction of the moving magnetic tape medium and also positioned to provide read-after-write (and regular read for those tracks) for the forward write head gaps 104, 106, 108, and 110. The read-after-write head 100 may now write to the tracks of the moving magnetic tape medium and/or read the tracks of the magnetic tape medium in a well known manner.

The tape direction is then selectively reversed to move the backward direction (opposite to the direction indicated by the arrow 205 in FIG. 3). The read-after-write head 100 is again indexed to another preselected position over the selected tracks of the magnetic tape medium which is now moving in the backward direction (as indicated by a direction opposite to the arrow 205 in FIG. 3) relative to the read-after-write head 100. The read-after-write head is then rotated to the preselected negative azimuth angle. In this position, the backward write head gaps 112, 114, 116, and 118 (backward write channels 1–4) are substantially aligned with the longitudinal direction of the moving magnetic tape medium. Furthermore, the read head gaps 120, 122, 124, and 126 (read channels 1–4) are also substantially aligned with the longitudinal direction of the moving magnetic tape medium and also positioned to provide read-after-write (and regular read for those tracks) for the backward write head gaps 112, 114, 116, and 118. The read-after-write head 100 may now write to the tracks of the moving magnetic tape medium and/or read the tracks of the magnetic tape medium in a well known manner.

This operation is selectively controlled in a well known manner by the tape recorder control system. As illustrated in FIG. 5, the azimuth mode typically produces a criss-cross overlapping pattern on the magnetic tape storage medium.

Thus, the read-after-write head 100 provides four channels of read and write during the azimuthal mode of operation in both the forward and backward directions of magnetic tape motion. This operation is selectively controlled in a well known manner by the tape recorder control system. As illustrated in FIG. 5, the azimuth mode typically produces a crisscross overlapping pattern on the magnetic tape storage medium.

Figure 8:
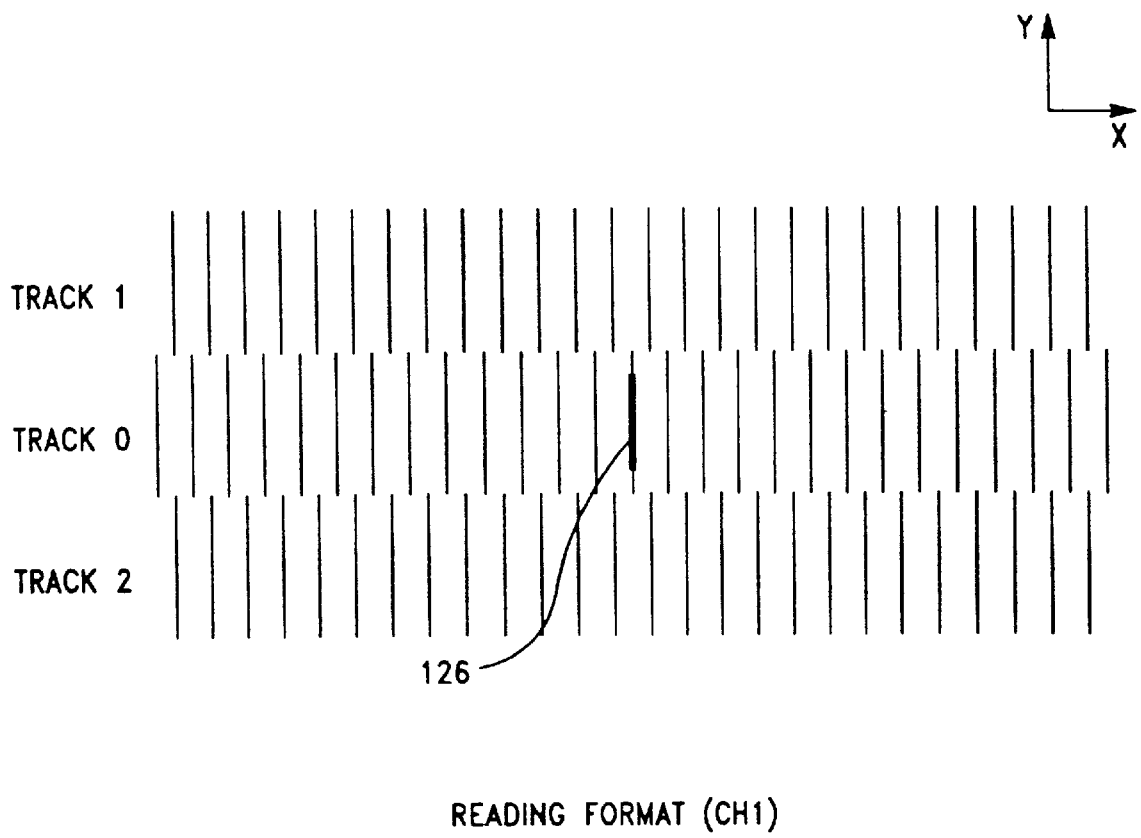
FIG. 8 illustrates reading the magnetic tape storage medium using read channel one of the read-after-write head of FIG. 2 in the non-azimuth mode of operation.

As illustrated in FIGS. 7 and 8, in the non-azimuth mode of operation, the read-after-write head 100 is indexed to a preselected position over the selected tracks of the magnetic tape medium which is moving in a forward direction (as indicated by the arrow 605 in FIG. 7) relative to the read-after-write head 100. The read-after-write head is then rotated to, or maintained at, the neutral or laterally aligned angular position illustrated in FIG. 7 (azimuth angle equals zero). In this position the forward write head gaps 106 and 110 (forward write channels two and four) are substantially aligned with the longitudinal direction of the moving magnetic tape medium. Furthermore, the read head gaps 120 and 124 (read channels one and three) are also substantially aligned with the longitudinal direction of the moving magnetic tape medium and also in opposing relationship to the forward write head gaps 106 and 110 (forward write channels two and four). The read-after-write head 100 may now write to the tracks of the moving magnetic tape medium and/or read the tracks of the magnetic tape medium in a well known manner.

The tape direction is then selectively reversed to move the backward direction (opposite to the direction indicated by the arrow 605 in FIG. 7). The read-after-write head 100 is again indexed to another preselected position over the selected tracks of the magnetic tape medium which is now moving in the backward direction (as indicated by a direction opposite to the arrow 605 in FIG. 7) relative to the read-after-write head 100. The read-after-write head is again maintained in the neutral or vertical angular position as illustrated in FIG. 7. In this position, the backward write head gaps 114 and 118 (backward write channels two and four) are substantially aligned with the longitudinal direction of the moving magnetic tape medium. Furthermore, the read head gaps 120 and 124 (read channels one and three) are also substantially aligned with the longitudinal direction of the moving magnetic tape medium and also in opposing relationship to the backward write head gaps 112, 114, 116, and 118. The read-after-write head 100 may now write to the tracks of the moving magnetic tape medium and/or read the tracks of the magnetic tape medium in a well known manner.

Thus, the read-after-write head 100 provides two channels of read (using read channels one and three) and write (using forward and backward write channels two and four) during the non-azimuthal (or vertical) mode of operation in both the forward and backward directions of magnetic tape motion.

In summary, FIGS. 2–8 show the illustrative dual-mode method of recording data onto azimuthal and non-azimuthal magnetic tapes by using the read-after-write head 100. The illustrative method generally comprises the steps of:

positioning the head 100 at a predetermined azimuth angle for four-channel azimuth mode recording, and then writing data onto a first magnetic tape in the four channel azimuth mode using the read-after-write recording head 100, etc.; as well as positioning the head 100 at the nominal non-azimuth null position for two-channel non-azimuth recording, and then writing data onto a second magnetic tape in two channel non-azimuth mode using the read-after-write recording head 100, etc.

During azimuth mode bidirectional recording the method includes the steps of positioning the head 100 at a positive predetermined angle for forward-direction four channel azimuth mode recording, and repositioning the head 100 at a negative or complementary azimuth angle for backward-direction four-channel azimuth mode recording, in addition to the writing steps. In both modes, the head 100 advantageously performs reading after writing during each writing operation in order to verify that the data pattern intended for writing has actually been recorded onto the tape.

The illustrative embodiment includes four forward write head gaps, four read head gaps, and four backward write head gaps. It will be apparent to a person of ordinary skill in the art, having the benefit of this disclosure, that the teachings of the disclosure may provide a read-after-write head for azimuth and non-azimuth modes of operation with any number and combination of read and write head gaps.

It will be appreciated by those of ordinary skill having the benefit of this disclosure that numerous variations from the illustrations in the notes will be possible without departing from the inventive concept described herein.

What is claimed is:

1. A method of storing data on magnetic tape using a read-after-write recording head including four forward write head gaps, four read head gaps, and four backward write head gaps, comprising:

positioning said recording head at a predetermined azimuth angle and writing data onto and reading data from a relatively moving first magnetic tape in azimuth mode using said four forward and backward write head gaps and said four read head gaps; and positioning said recording head at a non-azimuth, null angle and writing data onto and reading data from a relatively moving second magnetic tape in non-azimuth mode using two of said forward write head gaps, two of said backward write head gaps, and two of said read head gaps.

2. A method of storing data on magnetic tape using a read-after-write recording head including forward write head gaps, read head gaps, and backward write head gaps, comprising:

writing data onto and reading data from a first magnetic tape in azimuth mode using said all of said forward write head gaps, backward write head gaps, and read head gaps; and writing data onto and reading data from a second magnetic tape in non-azimuth mode using a portion of said forward write head gaps, backward write head gaps, and read head gaps.

3. The method of claim 2, wherein said read-after-write head includes four forward write head gaps, four read head gaps, and four backward write head gaps.

\* \* \* \* \*